United States Patent [19]

Tsujimoto

[11] Patent Number: 5,349,609

[45] Date of Patent: Sep. 20, 1994

[54] ADAPTIVE INTERFERENCE CANCELLATION AND EQUALIZATION USING EQUALIZER DECISION ERROR AS A COMMON CORRECTIVE FACTOR

[75] Inventor: Ichiro Tsujimoto, Tokyo, Japan

[73] Assignee: NEC Corporation, Japan

[21] Appl. No.: 100,982

[22] Filed: Aug. 3, 1993

[30] Foreign Application Priority Data

Aug. 5, 1992 [JP] Japan .................. 4-208652

[51] Int. Cl.[5] .......................... H04B 7/02
[52] U.S. Cl. ................... 375/100; 375/101; 375/14; 455/137; 455/278.1
[58] Field of Search .............. 375/100–101, 375/103, 14, 40, 58, 96; 455/137–138, 273, 278.1, 303

[56] References Cited

U.S. PATENT DOCUMENTS

| | | | |
|---|---|---|---|
| 4,829,543 | 5/1989 | Borth et al. | 375/14 |
| 4,852,090 | 7/1989 | Borth | 375/101 |
| 5,031,193 | 7/1991 | Atkinson et al. | 455/138 |
| 5,214,675 | 5/1993 | Mueller et al. | 375/101 |

*Primary Examiner*—Stephen Chin
*Assistant Examiner*—Young Tse
*Attorney, Agent, or Firm*—Ostrolenk, Faber, Gerb & Soffen

[57] ABSTRACT

An interference canceler comprises an adaptive equalizer, first and second diversity branches, and an auxiliary branch. A first correlator detects a correlation between the output of the equalizer and the output of the first diversity branch, and a second correlator detects a correlation between the equalizer output and the output of the second diversity branch. The first and second diversity branch signals are multiplied with the detected first and second correlations, respectively, and diversity combined. A phase variation component of one of the first and second correlations is detected and multiplied with the output of the auxiliary branch to produce a signal whose phase rotation is the same as that of the diversity combined signal. A weight control signal is derived by detecting a correlation between a decision error of the adaptive equalizer and the multiplied auxiliary branch signal. The latter is further multiplied with the weight control signal to cancel the interference component of the diversity combined signal by a subtractor, whose output is coupled to the adaptive equalizer.

6 Claims, 3 Drawing Sheets

ADAPTIVE INTERFERENCE CANCELLATION AND EQUALIZATION USING EQUALIZER DECISION ERROR AS A COMMON CORRECTIVE FACTOR

BACKGROUND OF THE INVENTION

1. Field of the Invention

The present invention relates generally to interference cancelers, and more particularly to a diversity receiver where adaptive interference cancellation is provided using an auxiliary reference input and is followed by adaptive equalization.

2. Description of the Related Art

In a prior art maximal ratio combining diversity receiver, shown in FIG. 1, an incoming signal from a transmit site as well as jamming signals from an unidentified source are received by high directivity main antennas 101, 102 and an auxiliary antenna 103 which is ominidirectional. The outputs of antennas 101, 102, 103 are respectively coupled to receivers 104, 105, 106 to which the local carrier from oscillator 111 is supplied for signal detection. Diversity branch signals at baseband frequency from receivers 104 and 105 are applied to subtractors 107 and 108, respectively, where they are combined with a respective output from multipliers 109 and 110, to which the output of receiver 106 is applied. Tap-gain controllers 112 and 113 are respectively provided in the feedback paths from subtractors 107 and 108 to the weight control input of multipliers 109, 110. Receivers 104 and 105 each includes an automatic-gain controlled amplifier and the weight controllers 112, 113 update their weighting factors of multipliers adaptively with the outputs of subtractors 107, 108 so that these outputs are reduced to a minimum. Under this condition, the envelope of the AGC output of each of receivers 104, 105 is maintained constant in what is known as "constant modulas algorithm", and interference signals in the desired signals are canceled by the output of multipliers 109, 110. The outputs of subtractors 107, 108 are further coupled to multipliers 114, 115, respectively, where they are multiplied with correlation products from correlators 116, 117 and diversity combined by a diversity combiner 118. The output of diversity combiner 118 is applied to an adaptive equalizer 119 to produce a decision symbol sequence. This output sequence is fed back to correlators 116, 117 where its correlations with the inputs of the associated multipliers 114, 115 are detected to control their weighting factors so that the diversity branch signals are combined at a maximal ratio by diversity combiner 118.

Diversity branch signals $x_1$, $x_2$ from receivers 104, 105 are given in the form:

$$x_1 = h_1 \cdot a_0 \cdot \exp(j\Delta\omega t) + \alpha J \quad (1)$$

$$x_2 = h_2 \cdot a_0 \cdot \exp(j\Delta\omega t) + \beta J \quad (2)$$

where, J is the interference signal, $h_1$ and $h_2$ are the transfer functions of the respective propagation paths of the diversity branch signals $x_1$ and $x_2$, $a_0$ is the 0th (i=0) symbol of a transmitted sequence $\{a_i\}$, $\Delta\omega$ is a frequency difference between the transmitted carrier and the receiver local carrier, and $\alpha$ and $\beta$ are the transfer functions of the respective propagation paths of the interference signal J from the respective sources to antennas 101 and 102. Respective correlation (expected) values $w_1$, $w_2$ at the output of correlators 116 and 117 are given by:

$$w_1 = E[x_1 {}^* a_0] = h_1{}^* \exp(-j\Delta\omega t) \quad (3)$$

$$w_2 = E[x_2 {}^* a_0] = h_2{}^* \exp(-j\Delta\omega t) \quad (4)$$

where, $E[\cdot]$ represents the expected value and the symbol * represents the complex conjugate. As represented by Equations (5) and (6), the outputs of multipliers 114, 115 are matched in phase and controlled in amplitude to the square of the respective transfer functions:

$$w_1 \cdot x_1 = h_1 h_1{}^* a_0 \quad (5)$$

$$w_2 \cdot x_2 = h_2 h_2{}^* a_0 \quad (6)$$

The diversity combined signal at the output of diversity combiner 118 is therefore in the form:

$$z(t) = (h_1 h_1{}^* + h_2 h_2{}^*) a_0 \quad (7)$$

By the maximal ratio diversity combining, the local beat frequency resulting from the frequency difference $\Delta\omega t$ is absorbed. This is advantageous in that it eliminates the need to employ a phase sync recovery circuit which would otherwise be required for synchronous detection and avoids the inherent false lock-in problem associated with carrier recovery.

On the other hand, if the interference signal $x_3$ is represented as $\gamma J$ (where $\gamma$ is the transfer function of the propagation path of the signal J from the source to auxiliary antenna 103), and if the weighting factors of multipliers 109 and 110 are represented as $C_1$ and $C_2$, respectively, the output signals $y_1$, $y_2$ of subtractors 107, 108 and their power levels $P_1$ and $P_2$ are given by:

$$\begin{aligned}
y_1(t) &= x_1 - C_1 x_3 \\
&= h_1 \cdot a_0 \cdot \exp(j\Delta\omega t) + J(\alpha - \gamma C_1)
\end{aligned} \quad (8)$$

$$\begin{aligned}
y_2(t) &= x_2 - C_2 x_3 \\
&= h_2 \cdot a_0 \cdot \exp(j\Delta\omega t) + J(\alpha - \gamma C_2)
\end{aligned} \quad (9)$$

$$\begin{aligned}
P_1 &= y_1(t) y_1{}^*(t) \\
&= |h_1 a_0|^2 + |J(\alpha - \gamma C_1)|^2
\end{aligned} \quad (10)$$

$$\begin{aligned}
P_2 &= y_2(t) y_2{}^*(t) \\
&= |h_2 a_0|^2 + |J(\alpha - \gamma C_2)|^2
\end{aligned} \quad (11)$$

The weight controllers 112 and 113 respectively control the weighting factors of the associated multipliers 109 and 110 so that the output power levels $P_1$ and $P_2$ of subtractors 107, 108 are reduced to a minimum. The weighting factors $C_1$ and $C_2$ are solved by Equation (12) and their optimum values $C_{1opt}$ and $C_{2opt}$ are given by Equation (13) as follows:

$$\partial P_1 / \partial C_1 = 0, \quad \partial P_2 / \partial C_2 = 0 \quad (12)$$

$$C_{1opt} = \alpha/\gamma, \quad C_{2opt} = \beta/\gamma \quad (13)$$

However, in real-world propagation fading is of primary concern as the level of desired signals varies from time to time as a result of the fading. Additionally, the level of interference signal varies with different conditions of propagation, it is uncertain as to whether the output power levels $P_1$ and $P_2$ are reduced to minimum due to the optimization of the weighting factors $C_1$ and $C_2$ or due to the fading of a propagation path.

Multipath fading is of another concern because it affects on the performance of the adaptive equalizer. The adaptive equalizer is usually formed of a linear filter of transversal configuration with tap gains and a decision error is detected to control the tap gains according to the minimum mean square error (MMSE) algorithm, whereby the root mean square value of the decision errors is minimized and hence distortions caused by multipath fading are minimized. However, residual distortions and receiver noise components are propagated through the successive taps of the linear filter and the decision error contains such undesired components. Due to the noise enhancement effect of the filter structure, the noise level of the decision output of the adaptive equalizer will exceed an acceptable level if the filter is controlled with high tap gain values, failing to provide optimum equalization. If the interference signal is not sufficiently eliminated, the residual interference signal will behave as if it were a noise component and the equivalent noise level at the decision output of the equalizer will exceed, and in the worst case, it will counteract the equalization. Because of the different evaluation factors employed by interference cancellation and adaptive equalization, no optimum weight control values exist that cause both of the evaluation factors to simultaneously reduce to a minimum.

Since the prior art system requires as many multipliers and associated weight controllers as there are diversity branches, the system complexity will increase if a greater number of diversity branches is needed.

SUMMARY OF THE INVENTION

It is therefore an object of the present invention to provide adaptive interference cancellation and adaptive equalization of multipath fading distortions using the decision error of the equalization as a common adaptive control factor.

According to the present invention, there is provided an interference canceler which comprises an adaptive equalizer for equalizing multipath distortions and producing an equalized output signal and a decision error signal, first and second diversity branches for receiving a transmitted signal and producing first and second diversity branch signals, respectively, and an auxiliary branch for receiving an interference signal and producing an auxiliary signal. A first correlator is associated with the first diversity branch for producing a first correlation output representative of a correlation between the equalized output signal from the adaptive equalizer and the first diversity branch signal, and a second correlator is associated with the second diversity branch for producing a second correlation output representative of a correlation between the equalized output signal and the second diversity branch signal. A first multiplier multiplies the first diversity branch signal with the first correlation output, and a second multiplier multiplies the second diversity branch signal with the second correlation output. The outputs of the first and second multipliers are combined into a diversity combined signal by a diversity combiner. A phase variation component of one of the first and second correlation outputs is detected and multiplied by a third multiplier with the auxiliary signal to produce a signal whose phase rotation is the same as a phase rotation of the diversity combined signal. A weight control circuit is responsive to the decision error signal from the adaptive equalizer and the output signal of the third multiplier for producing a weight control signal which is multiplied with the output signal of the third multiplier. The output of the fourth multiplier is subtracted from the diversity combined signal to produce an interference-canceled signal which is applied to the adaptive equalizer.

BRIEF DESCRIPTION OF THE DRAWINGS

The present invention will be described in further detail with reference to the accompanying drawings, in which.

DETAILED DESCRIPTION

Figure 1:
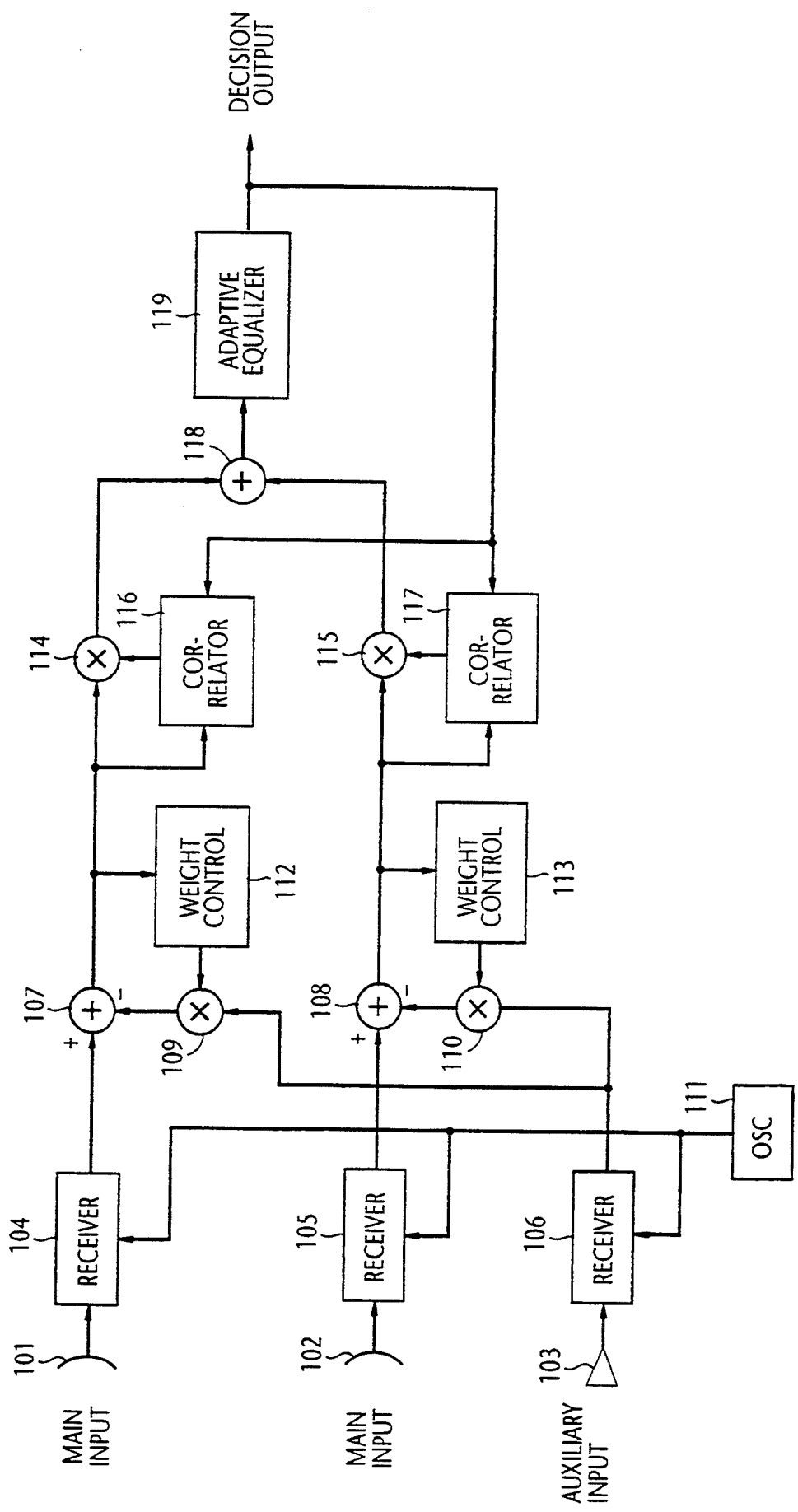
FIG. 1 is a block diagram of a prior art diversity receiver
Figure 2:
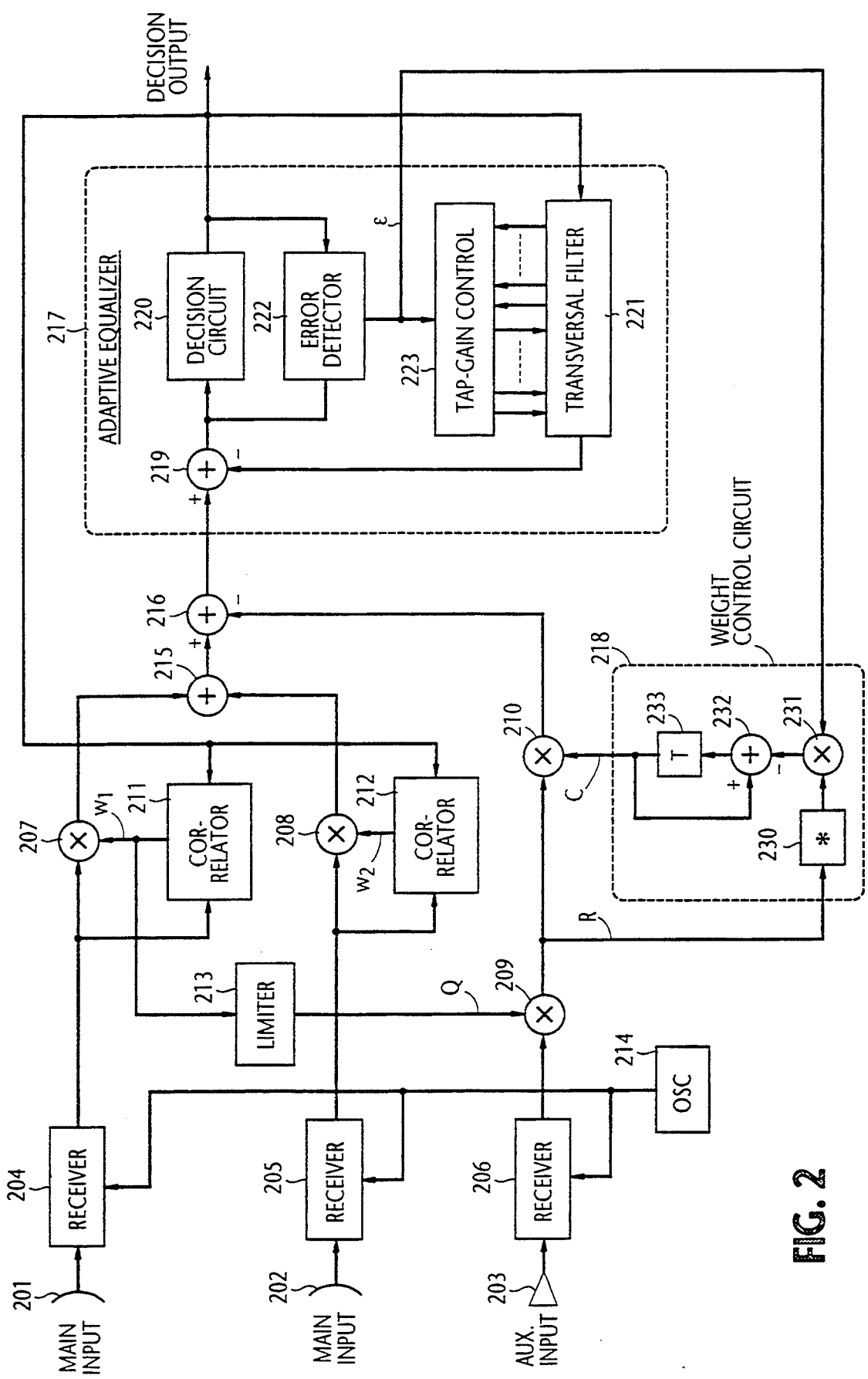
FIG. 2 is a block diagram of a diversity receiver according to the present invention.

Referring to FIG. 2, there is shown a maximal ratio combining diversity receiver according to the present invention. The diversity receiver of this invention comprises high directivity, main antennas 201, 202 and ominidirectional, auxiliary antenna 203. Automatic-gain controlled receivers 204 and 205 provide detection of signals from antennas 201 and 202 to produce baseband diversity branch signals $x_1$ and $x_2$ by mixing the received signals with a local carrier from oscillator 214, the diversity branch signals being fed into multipliers 207 and 208, respectively, where they are multiplied respectively with weighting factors $w_1$ and $w_2$. The output of auxiliary antenna 203 is detected by receiver 206 and fed into a multiplier 209. A first correlator 211 is connected between the input of multiplier 207 and the output of an adaptive equalizer 217 and a second correlator 212 is connected between the input of multiplier 208 and the output of an adaptive equalizer 217. The output of correlator 211 is connected to the weight control input of multiplier 207, the output of correlator 212 being connected to the weight control input of multiplier 208. The outputs of multipliers 207 and 208 are diversity combined at a maximal ratio by a diversity combiner 215 to produce a diversity combined signal y(t). The output of diversity combiner 215 is applied to one input of a subtractor 216.

A limiter 213 is provided which is connected to the output of correlator 211 to supply a weight control signal to multiplier 209. The output of multiplier 209 is fed into a multiplier 210 whose weight control is provided by a weight controller 218. The weight controller 218 derives the weight control signal from the input of multiplier 210 and a decision error signal supplied from the adaptive equalizer 217. The output of multiplier 210 is supplied to the second input of subtractor 216 where it is subtracted from the output of diversity combiner 215 to cancel an interference signal which may be present in the diversity combined signal.

Adaptive equalizer 217, which is known as a decision feedback equalizer, includes a subtractor 219, a decision circuit 220, a transversal filter 221, an error detector 222 which is connected across the input and output of the decision circuit 220 to detect a decision error $\epsilon$, and a tap-gain controller 223. The output of subtractor 216 is connected to one input of subtractor 219 to produce an equalized signal for coupling to the decision circuit 220 where it is compared with a decision threshold to produce a logic 1 or 0 depending on whether it is exceeded or not. The output of decision circuit 220 is applied to the input of transversal filter 221 in which the delay tap signals are weighted with respective tap gains provided from the tap-gain controller 223 as representative of the correlations between the tap signals and the decision error $\epsilon$. The output of the transversal filter 221 is applied to the second input of subtractor 219 to form a feedback loop. The output of decision error detector 222 is coupled to the weight controller 218.

Figure 3:
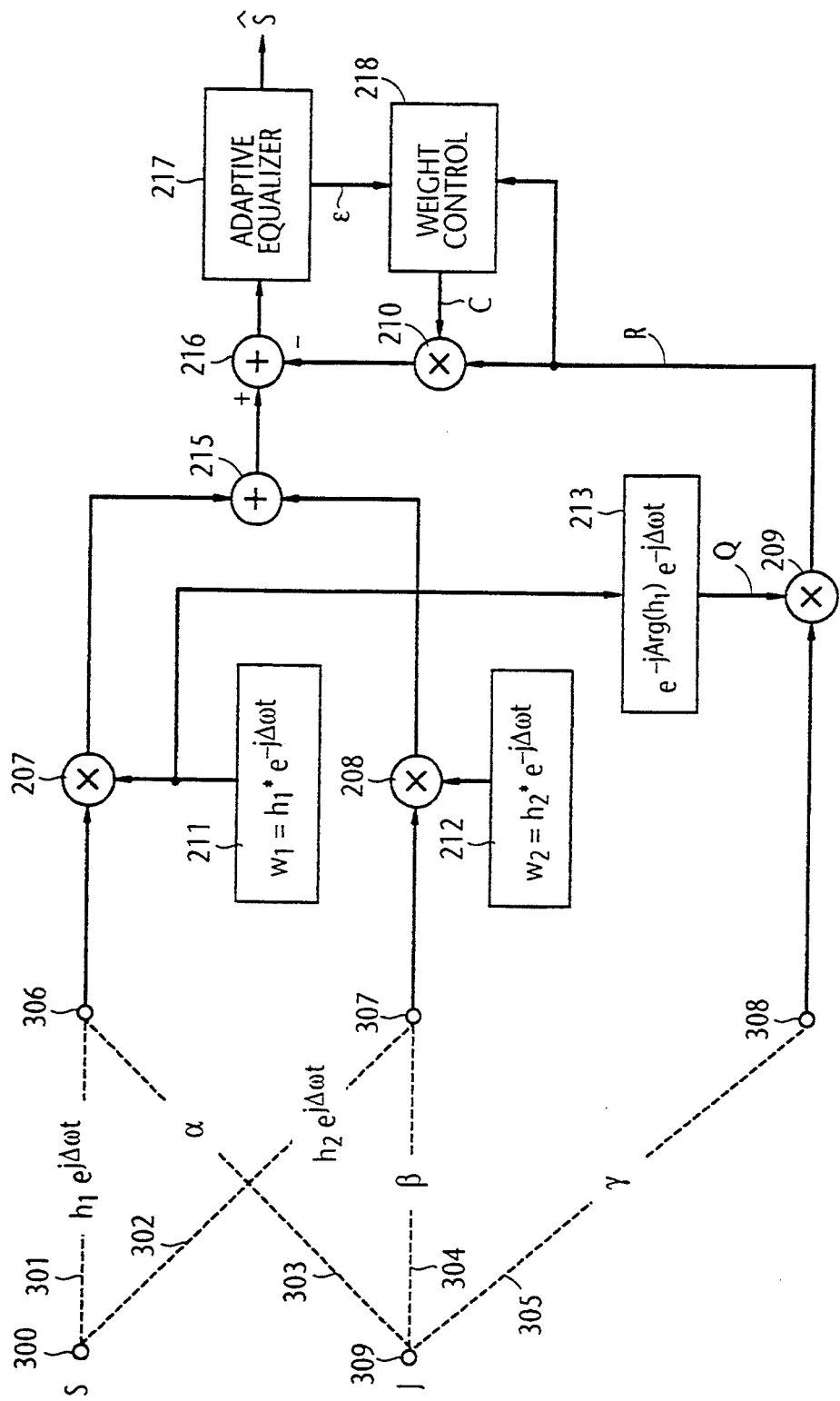
FIG. 3 is a block diagram useful for describing the operation of the present invention.

The operation of the present invention will be best understood with the aid of FIG. 3. Assume that a signal S from a transmit site 300 is propagated through a first path 301 having a transfer function $h_1 e^{j\Delta\omega t}$ and demodulated by receiver 204 to produce a signal component $h_1 \cdot S \cdot \exp(j\Delta\omega t)$ at a first diversity branch 306 and propagated through a second path 302 having a transfer function $h_2 e^{j\Delta\omega t}$ and demodulated by receiver 205 to produce a signal component $h_2 \cdot S \cdot \exp(j\Delta\omega t)$ at a second diversity branch 307. An interference signal J from an unidentified source 309 is propagated through a first path 302 having a transfer function $\alpha$ and demodulated by receiver 204 to produce an interference component $\alpha j$ at the first diversity branch 306, thus producing a first diversity branch signal $x_1$ at the input of multiplier 207. The same interference signal is propagated through a second path 303 having a transfer function $\beta$ and demodulated by receiver 205 to produce an interference component $\beta j$ at the second diversity branch 307, thus producing a second diversity branch signal $x_2$ at the input of multiplier 208. The interference signal J is propagated through a path 305 having a transfer function $\gamma$ and received by auxiliary antenna 203, receiver 206 to produce a reference, or auxiliary branch signal $\gamma J$ at a reference input 308.

Since the interference is not canceled at the inputs of the multipliers 207 and 208, the output of the diversity combiner 215 is represented as follows:

$$y(t) = (h_1 h_1^* + h_2 h_2^*)S + (\alpha h_1^* + \beta h_2^*)\{J \exp(-j\Delta\omega t)\} \tag{14}$$

where the first term of Equation (14) represents the desired component and the second term the interference component, which is canceled by the subtractor 216. Note that the interference component is a product of a phase rotation component $\exp(-j\Delta\omega t)$. As described in connection with the prior art this arises from the fact that, in a maximal ratio diversity combining using a correlation technique, the received signal is multiplied with an inverse phase component of a local beat (frequency difference between transmitted carrier and receiver local carrier) to provide in-phase control. While this phase rotation optimizes carrier synchronization for the desired signal, it represents a phase rotation which is more undesirable for the interference signal contained in each of the diversity branch signals than it is for the interference signal received by the auxiliary antenna 203. On the other hand, the adaptation speed of the equalizer 217 is satisfactory for it insofar as it can keep track of the variation speed of fading. To prevent the equalizer 217 from competing with the correlation adaptive maximal ratio diversity combining, the speed of the equalizer 217 is set lower than the adaptation speed of correlators 211 and 212. Therefore, the use of decision error $\epsilon$ simply as a correction signal for interference cancellation would result in an interference canceler not capable of keeping track of the variation of an interference signal containing such a local beat as represented by the second term of Equation (14).

The present invention enables the interference canceler to keep track of the phase variation of the interference by using the limiter 213 to extract the phase variation component (Q) of the weight control signal from the output of the correlator 211 and coupling the extracted signal to the weight control input of multiplier 209. The extracted phase variation component Q is given by Equation (15):

$$Q = \exp\{-j \text{ Arg }(h_1)\} \exp(-j\Delta\omega t) \tag{15}$$

(where, Arg represents Argument and Arg $(h_1)$ represents a phase angle).

The reference signal $\gamma J$ from reference input 308 is multiplied with the phase component Q by multiplier 209 to produce an output signal R which is expressed by:

$$R = [\gamma \exp\{-j \text{ Arg }(h_1)\}]\{J \exp(-j\Delta\omega t)\} \tag{16}$$

As is apparent from Equation (16), the output of multiplier 209 is a modulation of a reference signal with the local beat. By designating the local beat multiplied auxiliary signal $J \exp(-j\Delta\omega t)$ as Ja, the diversity combined output signal y(t) and the output signal R of multiplier 209 are given by:

$$y(t) = (h_1^* + h_2 h_2^*)S + (\alpha h_1^* + \beta h_2^*)Ja \tag{17}$$

$$R = [\gamma \exp\{-j \text{ Arg }(h_1)\}] Ja \tag{18}$$

Consider interference cancellation by using the main branch signal represented by Equation (17) and the auxiliary branch signal represented by Equation (18). Since the interference component of the main branch signal and the auxiliary branch signal are both multiplied with the same local beat and each of these signals rotates in phase in the same direction, they can be treated as signals containing the same local beat. The speed of the interference component Ja of Equation (17) relative to the signal Ja of Equation (18) is thus reduced to zero, thus eliminating the need for adaptive interference cancellation to keep track of the variation of the "Ja" component. Therefore, the decision error based interference cancellation is only required to keep track of the coefficients $(\alpha h_1^* + \beta h_2^*)$ and $\gamma \exp\{-j \text{ Arg }(h_1)\}$ of Equations (17) and (18). Since these components vary at a rate corresponding to the rate of variation of fading, the speed of adaptation of the interference canceler of this invention is sufficient to follow the variations of these components.

In order that the interference signal be canceled at the output of subtractor 216, Equation (19) is derived from Equations (17) and (18) as follows, and the weight control circuit 218 is required to generate an output C that satisfies Equation (19):

$$(\alpha h_1^* + \beta h_2^*)Ja = C[\gamma \exp\{-j \text{ Arg }(h_1)\}] Ja \tag{19}$$

Thus, the weight control signal has an optimum value $C_{opt}$ that satisfies Equation (20):

$$C_{opt} = (\alpha h_1^* + \beta h_2^*)/\gamma \exp\{-j \text{ Arg }(h_1)\} \tag{20}$$

As illustrated in FIG. 2, the weight control circuit 218 comprises a complex conjugate converter 230, a complex multiplier 231, a subtractor 232, and a delay line 233 which introduces a delay time of sample period T to the output of subtractor 232. The output signal R from from multiplier 209 is applied to conjugate converter 230 where it is converted to a complex signal and a correlation is detected between the complex signal and the decision error ε from adaptive equalizer 217 by complex multiplier 231. The correlation output of multiplier 231 is applied to subtractor 232 where it is subtracted from the output of delay line 233. Using the LMS (least mean square) algorithm, the output of delay line 233 is given by Equation (21):

$$C_n = C_{n-1} - \mu \epsilon_{n-1} R^*_{n-1} \qquad (21)$$

where, n is the sample, and $\mu$ represents the updating coefficient of the LMS algorithm. With the integer n approaching infinity, the $C_n$ value of the output of weight control circuit 218 converges to the optimum value $C_{opt}$.

The primary function of adaptive equalizer 217 is to provide removal of distortions caused by multipath fading and its adaptive control is based on the decision error signal. Therefore, optimum control is realized for equalization and interference cancellation. Additionally, interference cancellation is performed on the diversity combined signal, rather than on the individual diversity branch signals, allowing a compact design of the system.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An interference canceler comprising:
an adaptive equalizer for equalizing multipath distortions and producing an equalized output signal and a decision error signal;
first and second diversity branches for receiving a transmitted signal and producing first and second diversity branch signals, respectively;
a first correlator associated with said first diversity branch for producing a first correlation output representative of a correlation between the equalized output signal from said adaptive equalizer and said first diversity branch signal, and a second correlator associated with said second diversity branch for producing a second correlation output representative of a correlation between said equalized output signal and said second diversity branch signal;
a first multiplier for multiplying the first diversity branch signal with said first correlation output, and a second multiplier for multiplying the second diversity branch signal with said second correlation output;
a diversity combiner for combining the outputs of said first and second multipliers and producing a diversity combined signal;
an auxiliary branch for receiving an interference signal and producing an auxiliary signal;
means for detecting a phase variation component of one of said first and second correlation outputs;
a third multiplier for multiplying said auxiliary signal with said phase variation component and producing an output signal whose phase rotation is the same as a phase rotation of the diversity combined signal;
weight control means responsive to said decision error signal from said adaptive equalizer and the output signal of said third multiplier for producing a weight control signal;
a fourth multiplier for multiplying the output signal of said third multiplier with said weight control signal;
means for subtracting an output signal of said fourth multiplier from said diversity combined signal to produce an interference-canceled signal and applying the interference-canceled signal to said adaptive equalizer.

2. An interference canceler as claimed in claim 1, wherein said means for detecting a phase variation component comprises a limiter.

3. An interference canceler as claimed in claim 1, wherein said weight control means comprises means for detecting a correlation between said decision error signal and the output of said third multiplier as a representative of said weight control signal.

4. In a diversity receiver comprising an adaptive equalizer for equalizing multipath distortions and producing an equalized output signal and a decision error signal, first and second diversity branches for receiving a transmitted signal and producing first and second diversity branch signals, respectively, and an auxiliary diversity branch for receiving an interference signal and producing an auxiliary signal, an interference canceling method comprising the steps of:
a) producing a first correlation output representative of a correlation between the equalized output signal from said adaptive equalizer and said first diversity branch signal, and producing a second correlation output representative of a correlation between said equalized output signal and said second diversity branch signal;
b) multiplying the first diversity branch signal with said first correlation output and multiplying the second diversity branch signal with said second correlation output;
c) combining the first and second diversity branch signals multiplied by the step (b) and producing a diversity combined signal;
d) detecting a phase variation component of one of said first and second correlation outputs;
e) multiplying said auxiliary signal with said phase variation component and producing an output signal whose phase rotation is the same as a phase rotation of the diversity combined signal;
f) producing a weight control signal in response to said decision error signal from said adaptive equalizer and the auxiliary signal multiplied by the step (e);
g) multiplying the auxiliary signal multiplied by the step (e) with said weight control signal; and
h) subtracting the auxiliary signal multiplied by the step (g) from said diversity combined signal to produce an interference-canceled signal and applying the interference-canceled signal to said adaptive equalizer.

5. A method as claimed in claim 4, wherein the step (d) comprises limiting the amplitude of one of said first and second correlation outputs and producing a constant amplitude signal as representative of said phase variation component.

6. A method as claimed in claim 4, wherein the step (f) comprises detecting a correlation between said decision error signal and said auxiliary signal multiplied by the step (e) to produce said weight control signal.

* * * * *